Oct. 20, 1970          R. C. GOODMAN          3,535,035
ELECTROSTATIC COPIER LAMP REFLECTOR
Filed March 15, 1967                3 Sheets-Sheet 2

INVENTOR.
Robert C. Goodman
BY Edward H. Loveman
ATTORNEY

INVENTOR
Robert C. Goodman

BY Edward H. Loveman

ATTORNEY

United States Patent Office 3,535,035
Patented Oct. 20, 1970

3,535,035
ELECTROSTATIC COPIER LAMP REFLECTOR
Robert C. Goodman, Binghamton, N.Y., assignor to GAF Corporation, New York, N.Y., a corporation of Delaware
Filed Mar. 15, 1967, Ser. No. 623,375
Int. Cl. G03g 15/00
U.S. Cl. 355—3                      1 Claim

ABSTRACT OF THE DISCLOSURE

A multi-faceted elliptical reflector adapted to reflect light rays emanating from a light source in a uniform light intensity pattern. In essence, the reflecting surface is constituted of a plurality of contiguous flat or planar surfaces which define the curvilinear reflecting surface. The reflector is particularly suitable in conjunction with electrostatic office copying machines.

---

This invention relates generally to improvements in light-ray reflecting devices and, more particularly, to novel and improved light reflectors used in office copying machines of the electrostatic type employed in reproducing an original on a sensitized copy paper.

Basically, electrofax office copiers operate in a manner whereby a sheet of sensitized paper is electrostatically charged and then partially discharged by exposure to light to produce a latent image conforming to the original information being reproduced. Subsequently, the latent image on the sensitized paper is developed by subjecting the paper to a powder or liquid developer, thereby producing a copy of the original.

In most electrostatic copying machines the exposure light for the sensitized paper is obtained from the scanning of an original by a light source while the original is being conveyed through the copying machine or copier. This scanning sequence is of primary importance, since an improperly or unevenly scanned original will result in the reproduction of unsatisfactory copies. Consequently, the installation of properly designed light source reflecting devices or reflectors in the copiers for scanning the originals conveyed therethrough becomes an absolute necessity.

Heretofore, in most prior art electrostatic copiers, the originals passing through the machine have been scanned by light rays projected toward an aperture, and with the originals moving therepast. Generally, the light rays emanate from a light source or lamp positioned within the region of the curved surface of a parabolic or elliptical reflector, the latter of which directed the light rays toward the scanning aperture in a predetermined light intensity pattern. Although these prior art parabolic and elliptical reflectors have proven themselves to be commercially feasible, problems have been encountered in their utilization in present electrostatic copying machines, particularly when applied to relatively small office copiers.

The scanning aperture in commercially available office copiers generally is in the form of a slit and in the smaller office copiers is, because of space limitations, only approximately one inch in width. Heretofore, when using parabolic reflectors which direct the light rays from the lamp toward the aperture, a major portion of the light was wasted. This was due to the parabolic reflector configuration which directed the light rays in a parallel or somewhat divergent pattern. Since the lamp is usually larger than the aperture width, the necessarily substantially large size of the parabolic reflectors makes them physically impractical when installed in small office copiers. However, by comprising in size in the reflector installation it is possible to focus some of the light rays on the relatively narrow scanning aperture, but this, of course, results in extremely unsatisfactory lighting efficiencies.

Subsequently, the problems inherent in parabolic reflectors in small office copiers have been greatly alleviated through the use of reflectors having elliptical reflecting surfaces. An elliptical reflector will project light rays toward the scanning aperture in a converging focal light pattern, thus greatly increasing the lighting efficiency over that achieved wtih a parabolic reflector. However, prior art elliptical reflectors have been subject to other serious disadvantages. One of these disadvantages is that each of the light rays reflected from the elliptical surface of the reflector must pass through a focal point located before the scanning surface, which results in an uneven distribution of the light intensity across the width of the scanning aperture. This is to say that the projected light rays have generally concentrated into a peak between the two edges of the aperture slit while rapidly diminishing toward the edges thereof. Inasmuch as the lamps or light sources used in office copiers of this type generate a relatively high level of infrared rays, the temperature at the point of light intensity peaking tends to increase to a high range. Thus, another disadvantage of elliptical reflectors is that this increase in temperature may frequently cause discoloration or even charring and burning of the original while it is moving across the aperture slit.

The reflecting device or reflector according to this invention overcomes the aforedescribed and other disadvantages encountered in prior art reflectors used in electrostatic copying machines by providing a novel and improved reflecting surface which will project the light rays emanating from the light source across the scanning aperture in a highly efficient and uniform light intensity pattern. To this effect, the reflecting surface of the reflector is constituted of a plurality of multi-faceted planar or flat surfaces which are in contiguous end-to-end relationship so as to define a generally elliptical curvilinear surface. The light rays reflected from this multifaceted elliptical reflector are dispersed across the width and area of the scanning aperture slit at a substantially uniform light intensity. This will effectually prevent the focusing and peaking of the light intensity at any point between the two edges of the aperture, thereby terminating the source of the temperature gradient across the width of the aperture slit, and as a result, avoiding discoloration, charring or burning of the originals being conveyed across the scanning aperture.

Accordingly, it is a primary object of the present invention to provide a novel and improved light-ray reflecting device.

Another object of the present invention is to provide an improved reflector having a multi-faceted curvilinear reflecting surface adapted to project light rays in a uniform light intensity pattern.

A further object of the present invention is to provide an elliptical reflector having a multi-faceted reflecting surface constituted of a plurality of contiguous planar surfaces.

It is a more specific object of the present invention to provide an elliptical reflector having a reflecting surface constituted of a plurality of contiguous planar surfaces adapted to project a uniformly intense light pattern on the scanning aperture of an electrostatic copying machine.

These and other objects and many of the attendant advantages of this invention will be readily appreciated as the same becomes better understood by reference to the following detailed description when considered in connection with the accompanying drawings in which.

Figure 1:
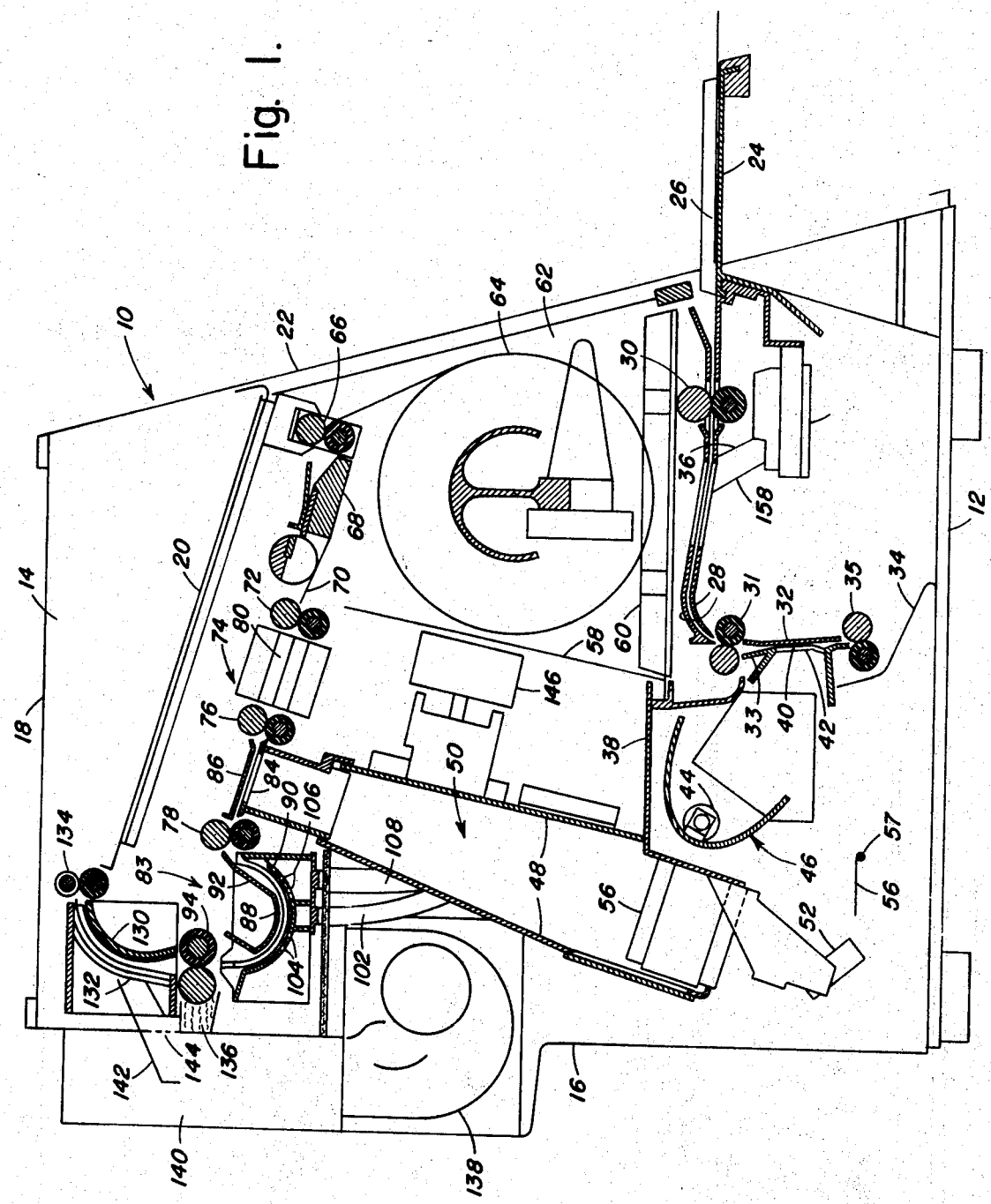
FIG. 1 is a side elevational view, in section, of an electrostatic office copier incorporating a reflector of the invention.

Referring now to the drawings, wherein like reference characters designate like or corresponding parts throughout the several views, FIG. 1 is illustrative of an electrostatic office copier employing a reflector according to this invention. By way of example, an electrostatic office copier of the type described in some detail below, would be suitable. The housing for the machine which is illustrated in FIG. 1 is generally designated by reference numeral 10. The housing 10 includes a bottom wall 12 and a pair of side walls 14 which are mounted on opposite sides of the machine. The rear of the housing 10 is enclosed by a vertically extending wall portion 16, and a top wall 18 extends forwardly from wall portion 16 between the side walls 14. Top wall 18 extends above a delivery tray 20 which is attached between the side walls 14 and slopes down toward the front of the machine. A sloping front panel 22 is attached to each of the side walls 14 and extends downwardly and forwardly. Front panel 22 extends downwardly from the front of tray 20 to just above a horizontal feed tray 24 so as to form a space 26. The space 26 between the bottom of front panel 22 and tray element 24 serves as the entry opening for an original to be inserted into the copier.

In the interior of the housing 10, a curved guide member 28 is adapted to receive original material fed through opening 26 under the urging of a pair of infeed rollers 30. Guide members 28 direct the material in a downward direction towards the bottom wall 12 of the machine through another spaced pair of feed rollers 31 and through vertical guide members 32 and 33. Inclined guide 34 conveys the original material via a pair of rollers 35 toward the front of the machine along bottom wall 12. A pair of microswitches 36 and 158 are positioned in the interior of housing 10 in a location to engage material fed through opening 26 and along guide member 28.

Attached to sidewalls 14 of the housing is a partition 38 in spaced relation to bottom wall 12 so as to define a scanning station of the copier. The guide member 33 may be comprised of a glass plate 40 or other suitable means which covers an opening 42 for the scanner operation, and also prevents scanned original material from entering the opening. Below partition 38, a lamp 44 is attached. The lamp is generally a high intensity light source comprising, for example, a tungsten filament lamp having a quartz jacket which may be mounted within a reflector generally designated as reference numeral 46 directing the light towards the glass plate 40. Generally upwardly extending partitions 48 form a chamber generally designated as reference numeral 50, through which light reflecting from glass plate 40 and directed by a reflector 52 is passed. A suitable lens 54 is adjustably supported at the bottom of chamber 50 between partitions 48. The light intensity directed into chamber 50 is operator controlled via rotatable exposure shutter 56 mounted on a shaft 57 and interposed between the opening 40 and the reflector 52. The top of chamber 50 forms an exposure station for the sensitized material, to be described in greater detail below.

The interior of the housing is separated into a further compartment by means of plate member 58 and 60 extending between sidewalls 14 of the housing. These plates are positioned near the front end of the housing below delivery tray 20 to define a darkened chamber 62 therebetween. To the inner sides of the sidewalls 14, suitable support brackets (not shown) are attached. A supply roll of sensitized paper 64 is carried by these brackets and is nested within the confines of plates 22, 58, and 60. Since this area is light-tight, the sensitized surface of the paper is protected. The sensitized material from roll 64 is guided between a pair of feed rollers 66 and over a cutter block 68. Rollers 66 and the block 68 are also supported by side walls 14. A further guide 70 is mounted to the side walls adjacent block 68 to direct the copy paper past a normally de-energized cutter 72 to a charging station generally designated as reference numeral 74.

The copy paper is assisted in its transport through the charging station by paired rollers 76 and 78 disposed in front and rear of the charging station, adjacent to the top of chamber 50, respectively. The charging station 74 includes a twin corona discharge device 80 straddling the path of travel of the copy paper through the charging station. Instead of a twin corona device, a single corona device disposed above or below the path of the paper may also be employed. The details of these corona devices are known in the art and do not constitute a part of the invention. The corona device 80 extends between housing sidewalls 14 and is connected to a high voltage transformer suitably mounted in the housing 10. A pair of developer in-feed rollers 82 are mounted to the rear of the exposure station, and supported by the side walls 14. A transparent glass plate 84 or other suitable guide means and a spaced guide plate 86 are positioned at the top of chamber 50 to thereby provide a positive guide channel for the copy paper passing the exposure station between rollers 78 and rollers 82. The rollers 82 direct the copy paper to a developer station generally designated by reference numeral 83 which will now be described.

Developer station 83 includes a pair of curved spaced guide plates 88 and 90 positioned on the opposite side of the paired feed rollers 82. These guide plates are supported by sidewalls 14 and define a generally concave channel 92 through which copy paper exiting from rollers 82 moves downwardly during the first portion of travel therethrough and thereafter moves upwardly with respect to the housing 10 towards an additional pair of rollers 94 supported by side walls 14 at the opposite ends of the guide plates 88 and 90 from rollers 82.

A liquid developer or toner reservoir (not shown) is positioned within housing 10 and is adapted to provide a flow of toner into channel 92. A plurality of apertures 104 are provided at one end in the lower portion of curved guide plate 90 to facilitate the flow of the toner into channel 92, while a plurality of apertures 106 are provided at the other end in the upper portion of guide plate 90, thus allowing any overflow of toner in channel 92 to return to the reservoir through a conduit 108. The apertures 104 are adapted to receive toner from conduit 102 whereby toner is introduced into channel 92 against the direction of travel of the copy paper. This will cause the paper to float off the lower guide plate and move along the surface of guide plate 88 during travel through the developer station.

Curved guide members 130 and 132 will guide the developed copy paper moving through rollers 94 upwards and forwards through another pair of feed or transport rollers 134 into delivery tray 20 near the top of the machine. A wiper 136 is attached to the rear wall 16 of the housing 10 and is in contact with one of rollers 94, thereby serving to return excess liquid developer from rollers 94 into channel 92 and subsequently through conduit 109 to the reservoir.

A blower 138, positioned adjacent to the developer station, draws air across the light source or lamp 44 to cool the latter. This air, which has been heated by the lamp is pumped by the blower 138 into an outlet duct 140 for venting to the atmosphere. A portion of the heated air in duct 140 is, however, by-passed into surface contact with the wet developed copy paper passing between guide members 130 and 132, thereby drying the paper before it is fed into delivery tray 20. The by-passing of the air in duct 140 is attained by positioning a baffle 142 in the duct and providing openings 144 in the duct wall for the egress of air.

Suitable drive motor means 146 are provided in housing 10 for driving the various movable roller and operating elements through clutches, sprockets, chain and belt drives (not shown) which are well known in the art. For a more detailed description, reference may be had to copending U.S. Ser. No. 623,752.

Figure 2:
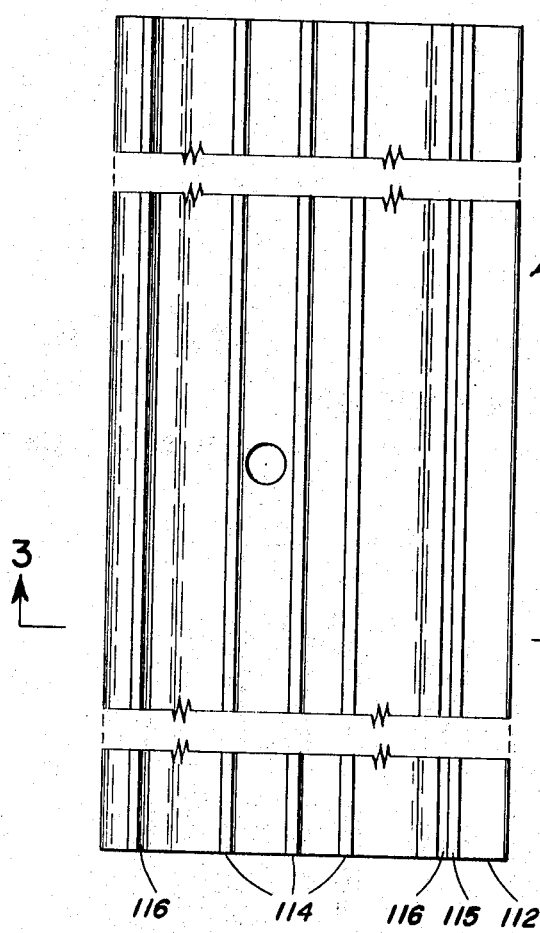
FIG. 2 is an enlarged view of the reflector shown in FIG. 1.
Figure 4:
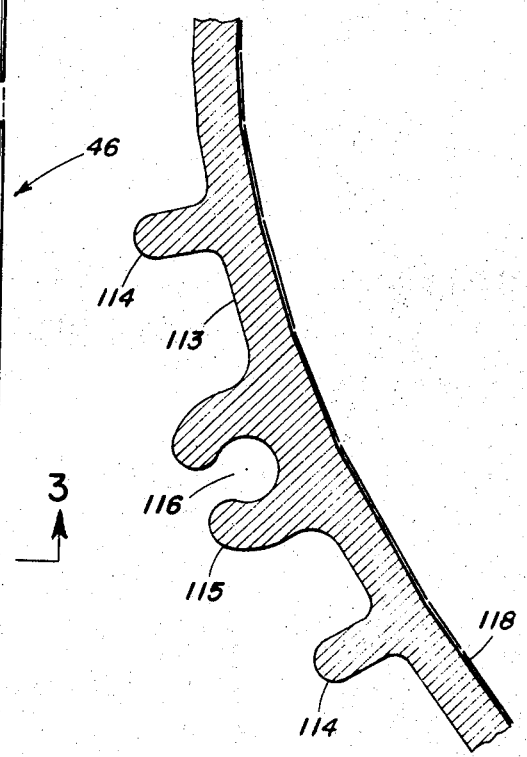
FIG. 4 is an enlarged fragmentary section of the circled portion of FIG. 3.
Figure 3:
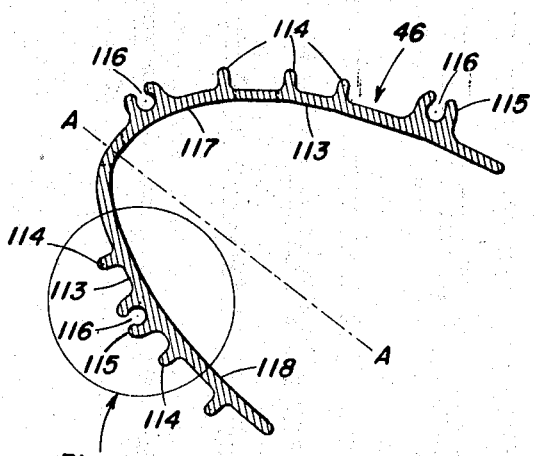
FIG. 3 is a sectional view of the reflector taken along line 3—3 in FIG. 2.

Referring now to the reflector 46, shown in greater detail in FIGS. 2, 3, and 4 of the drawings, this comprises a single member 112 extending between the side walls 14 of housing 10 and fastened thereto in a fixed spaced apart relationship to the aperture 42. Member 112 may be formed of an aluminum extrusion having a main curved portion 113 and a plurality of integral stiffener ribs 114. Some of the ribs 115 may consist of bent members forming a generally circular opening 116 therebetween. Suitable fastening means may be inserted through drilled holes in side walls 14 of housing 10 (not shown), which are adapted to project into openings 116. This, in effect, will attach reflector 46 to the housing in a rigid and stationary manner.

The inner or reflecting surfaces 117 and 118 of portion 113 has the general configuration of an ellipse generated about a common axis A, and is designed so as to project reflected light emanating from lamp 44 toward aperture 42. Inasmuch as the lamp 42 is angularly positioned with respect to the aperture 44, it has been determined that the most efficient light distribution may be realized by having the reflecting surfaces 117 and 118 comprise segments of different ellipses. That is to say that although the general elliptically shaped segment surfaces 117 and 118 are generated about the common axis A, they are asymmetrically displaced thereabout.

Figure 5:
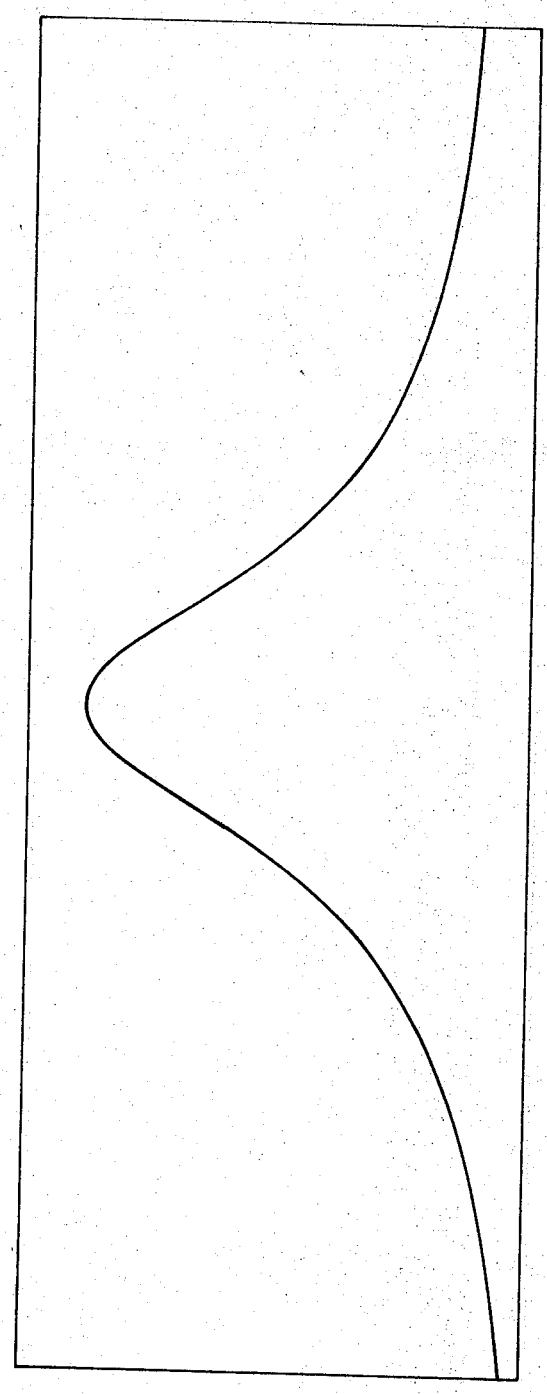
FIG. 5 is a graph illustrating the light-intensity pattern prior art elliptical reflectors.

When a smoothly curved elliptical reflecting surface is used, as in prior art reflectors, the light intensity pattern across the slit width of aperture 42 varies, as illustrated in FIG. 5 of the drawings. This shows a peaking of light intensity between the edges of aperture 42, with a resulting temperature gradient, i.e. increase in temperature, near the center portion of the aperture slit. As a result, the originals being scanned while passing aperture 42 are frequently subjected to discoloration or even charring and burning.

Figure 6:
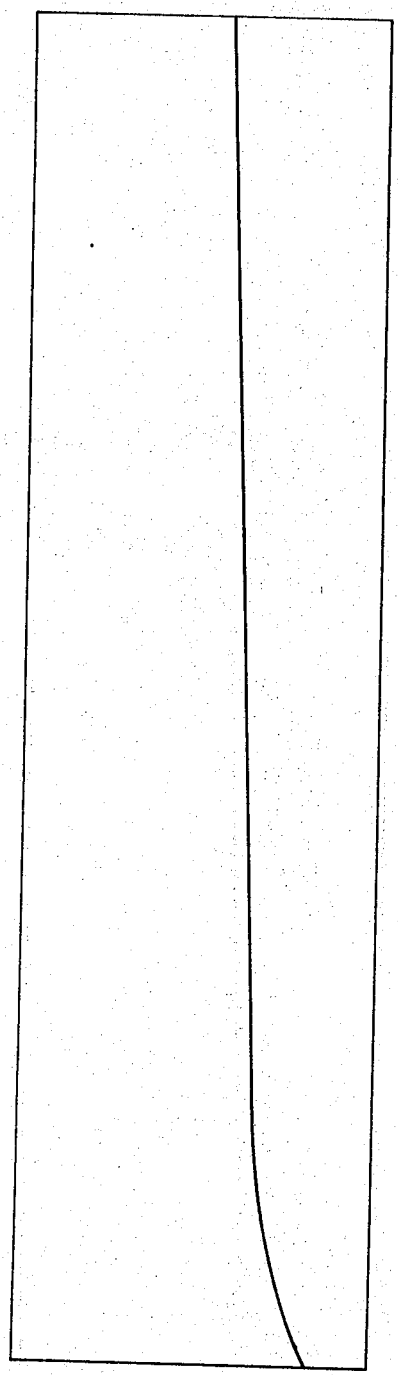
FIG. 6 is a graph illustrating the light-intensity pattern of the reflector of this invention.

Accordingly, the elliptical reflecting surfaces 117 and 118 of the present reflector 46 are finished into a plurality of contiguous flat or planar surfaces, as shown in FIG. 4 of the drawings. The planar surfaces form a multi-faceted reflecting surface which will distribute the reflected light rays over the width of aperture 42 in a generally uniform light intensity pattern. This is clearly shown in the representative graph of FIG. 6 of the drawings.

Consequently, the peaking of light intensity obtained with prior art reflectors is practically completely eliminated, thus avoiding any detrimental effects on the originals being scanned in the office copier.

The reflecting surfaces 117 and 118 of reflector 46 may also be coated with a suitable light reflecting material, such as clear iridite, which will enhance the reflecting properties thereof.

A further aspect of this invention lies in that the novel improved multi-faceted elliptical reflector greatly simplifies the after-control of the optical system of the copying machine, thereby providing an improved light control during the copying process of the apparatus.

Although the reflector has been described with reference to a particular type of copying machine, it will be readily apparent to one skilled in the art that the reflector lends itself to various other machines and uses.

It should also be understood that the foregoing relates to only a preferred embodiment of the invention, and that it is intended to cover all changes and modifications of the example of the invention herein chosen for the purpose of the disclosure, which do not constitute departures from the spirit and scope of the invention.

What is claimed is:
1. In an electrostatic copying machine for producing copies of an original on sensitized material by reflecting a source of light on said original and scanning the latter including a linear light reflecting device including a member having an elliptical surface adapted to reflect rays of light emanating from a line-filament light source toward a light-receiving aperture, said reflecting surface comprising a plurality of continuously varying planar surfaces positioned in contiguous angular relationship to each other and to the filament and defining a generally multi-faceted curvilinear surface, whereby said reflected light rays are focused over the area of said aperture in a substantially uniform light intensity pattern.

References Cited

UNITED STATES PATENTS

| 3,125,301 | 3/1964 | Stotter | 240—103 X |
| 3,302,519 | 2/1967 | Young | 240—41.37 X |
| 3,368,071 | 2/1968 | Bentzman | 240—47 X |

FOREIGN PATENTS

| 487,141 | 6/1938 | Great Britain. |

NORTON ANSHER, Primary Examiner

R. A. WINTERCORN, Assistant Examiner

U.S. Cl. X.R.

240—1.3, 41.36; 355—67